United States Patent
Chambers et al.

(10) Patent No.: US 10,423,900 B2
(45) Date of Patent: Sep. 24, 2019

(54) PARAMETER STANDARDIZATION

(75) Inventors: Gregory L. Chambers, Atlanta, GA (US); Kenneth Van Meter, Alpharetta, GA (US)

(73) Assignee: Engie Insight Services Inc., Spokane, WA (US)

( * ) Notice: Subject to any disclaimer, the term of this patent is extended or adjusted under 35 U.S.C. 154(b) by 2866 days.

(21) Appl. No.: 12/126,556

(22) Filed: May 23, 2008

(65) Prior Publication Data
US 2009/0132091 A1 May 21, 2009

Related U.S. Application Data

(60) Provisional application No. 60/988,939, filed on Nov. 19, 2007.

(51) Int. Cl.
| | | |
|---|---|---|
| G01D 4/00 | (2006.01) |
| H04L 29/06 | (2006.01) |
| G01M 1/00 | (2006.01) |
| G06F 1/32 | (2019.01) |
| G05B 13/00 | (2006.01) |
| G06Q 10/06 | (2012.01) |
| G06Q 50/06 | (2012.01) |

(52) U.S. Cl.
CPC .......... *G06Q 10/06* (2013.01); *G06F 1/32* (2013.01); *G06Q 50/06* (2013.01); *G05B 13/00* (2013.01)

(58) Field of Classification Search
USPC ......... 705/1.01, 1.1, 412; 700/276; 713/320; 702/62
See application file for complete search history.

(56) References Cited

U.S. PATENT DOCUMENTS

| | | | |
|---|---|---|---|
| 4,497,031 A * | 1/1985 | Froehling et al. ............ 700/276 |
| 5,761,083 A | 6/1998 | Brown et al. |
| 5,924,486 A | 7/1999 | Ehlers et al. |
| 6,211,782 B1 | 4/2001 | Sandelman et al. |
| 6,241,156 B1 | 6/2001 | Kline et al. |

(Continued)

FOREIGN PATENT DOCUMENTS

| | | |
|---|---|---|
| EP | 1196003 | 4/2002 |
| GB | 2467981 | 8/2010 |

(Continued)

OTHER PUBLICATIONS

"Artificial intelligence and networking in integrated building management systems", (1997), Automation in Construction, G. Clark, P. Mehta, pp. 481-498 (Year: 1997).*

(Continued)

*Primary Examiner* — Lynda Jasmin
*Assistant Examiner* — Kimberly L Evans
(74) *Attorney, Agent, or Firm* — Lee & Hayes, P.C.

(57) ABSTRACT

Included are embodiments for parameter standardization. At least one embodiment of a system includes a first determining component configured to determine at least one business rule associated with at least one environment and a second determining component configured to determine settings for a plurality of assets associated with the at least one environment to enforce the determined at least one business rule. Some embodiments include a sending component configured to send a signal to the plurality of assets to implement the business rule.

24 Claims, 13 Drawing Sheets

(56) References Cited

U.S. PATENT DOCUMENTS

| | | | |
|---|---|---|---|
| 6,741,915 B2* | 5/2004 | Poth | G05B 15/02 700/276 |
| 6,851,621 B1 | 2/2005 | Wacker et al. | |
| 6,868,295 B2 | 3/2005 | Huang | |
| 6,961,641 B1 | 11/2005 | Forth et al. | |
| 7,216,043 B2* | 5/2007 | Ransom | G01D 4/004 702/62 |
| 7,659,813 B2 | 2/2010 | Chambers et al. | |
| 2002/0022991 A1 | 2/2002 | Sharood et al. | |
| 2003/0171851 A1 | 9/2003 | Brickfield et al. | |
| 2003/0225483 A1 | 12/2003 | Santinato et al. | |
| 2004/0133314 A1* | 7/2004 | Ehlers | G06Q 10/10 700/276 |
| 2004/0225513 A1 | 11/2004 | Haeberle et al. | |
| 2005/0038571 A1 | 2/2005 | Brickfield et al. | |
| 2005/0046584 A1* | 3/2005 | Breed | 340/825.72 |
| 2005/0243867 A1 | 11/2005 | Petite | |
| 2005/0275525 A1 | 12/2005 | Ahmed | |
| 2005/0278597 A1 | 12/2005 | Miguelanez | |
| 2006/0105697 A1* | 5/2006 | Aronstam et al. | 454/256 |
| 2006/0191275 A1 | 8/2006 | Jung et al. | |
| 2006/0288101 A1 | 12/2006 | Mastrodonato et al. | |
| 2007/0005191 A1* | 1/2007 | Sloup | G05B 13/041 700/276 |
| 2007/0038700 A1 | 2/2007 | Eryurek et al. | |
| 2007/0067656 A1* | 3/2007 | Ranganathan | G06F 1/3203 713/320 |

FOREIGN PATENT DOCUMENTS

| | | |
|---|---|---|
| GB | 2471759 | 1/2011 |
| WO | 2010033038 | 3/2010 |
| WO | 2011014073 | 2/2011 |

OTHER PUBLICATIONS

Chambers, U.S. Appl. No. 12/126,556, filed May 23, 2008.
Clark, G. et al., "Artificial Intelligence and Networking in Integrated Building Management Systems." Automation in Construction, Elsevier Science Publishers, Amsterdam NL, vol. 5, No. 506, Sep. 1, 1997, pp. 481-198.
European Search Report dated Oct. 13, 2008 for PCT/US2007060271.
International Search Report and Written Opinion dated Oct. 24, 2007, for PCT/US2007060271.
Chambers; U.S. Appl. No. 12/126,566, filed May 23, 2008.
Chambers; U.S. Appl. No. 12/133,098, filed Jun. 4, 2008.
Chambers; U.S. Appl. No. 11/619,838, filed Jan. 4, 2007.
International Search Report and Written Opinion, dated Sep. 3, 2008.

\* cited by examiner

PARAMETER STANDARDIZATION

CROSS REFERENCE

This application claims the benefit of U.S. Provisional Application Ser. No. 60/988,939, filed Nov. 19, 2007, which is hereby incorporated by reference in its entirety.

BACKGROUND

Utilization of one or more assets, including but not limited to, heater systems, air conditioning systems, refrigeration systems, alarm systems, security systems, appliances, electronics, and/or other devices associated with an environment and/or business equipment may result in a large amount of energy consumed and associated asset repair service costs. As energy costs may be a significant portion of a home's and/or business's budget, reduction of energy consumption and associated expenses may be desired. In an effort to reduce energy consumption and/or associated operating costs, many homes and/or businesses utilize control systems including, but not limited to, timers and other scheduling mechanisms to automatically activate or deactivate one or more assets at predetermined times and operate equipment to defined business parameters. While these control systems may reduce energy usage, the systems are generally inflexible and may not effectively accommodate for continuing business changes to operations and schedules.

Although this problem may be partially addressed by the inclusion of system parameter options and/or utilization of a customer service representative to reactively intervene, such solutions are generally difficult to utilize and often result in system ineffectiveness, which may introduce further problems. Control systems may, at times, be configured to track and manage certain parameters of individual unit performance; however, entire building system optimization of multiple units operating in tandem is, largely left unaddressed.

Similarly, some problems result from an inability of current implementations to accurately materialize environment settings. As a nonlimiting example, when people enter a room, an environment may deviate from the desired settings. Similarly, other factors, such as changing seasons, changing weather, etc. may alter the work required to materialize the desired settings.

SUMMARY

Included are embodiments for parameter standardization. At least one embodiment of a system includes a first determining component configured to determine at least one business rule associated with at least one environment and a second determining component configured to determine settings for a plurality of assets associated with the at least one environment to enforce the determined at least one business rule. Some embodiments include a sending component configured to send a signal to the plurality of assets to implement the business rule.

Also included are embodiments of a method. At least one embodiment includes determining at least one business rule associated with at least one environment and determining settings for a plurality of assets associated with the at least one environment to enforce the determined at least one business rule. Some embodiments include sending a signal to the plurality of assets to implement the business rule.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Figure 1:
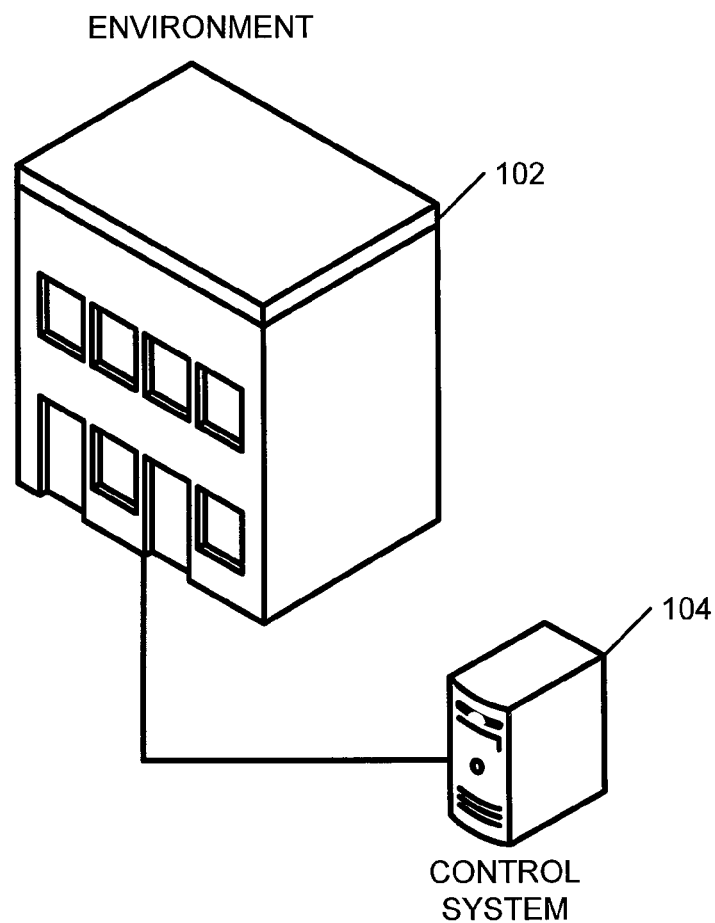
FIG. 1 depicts a nonlimiting example of an environment and a control system.

Included in this disclosure is a plurality of processes, tools, and technologies that may enable a client to ensure performance of assets, critical business equipment, and systems to reduce the total cost of energy by reducing energy usage, optimizing energy demand, optimizing energy performance optimization systems and energy using asset efficiencies, and reducing maintenance service costs, prolonging the useful life of assets, and enhancing reliability of business operations. Additionally, this disclosure addresses optimization of energy expenditures at a system level. This allows a client to regulate energy usage, asset repair and replacement, and equipment maintenance to reduce operating costs, via a connection to an organization's Energy Management System (EMS) or Building Management System (BMS) using a virtual audit tool and/or other diagnostic routines. The virtual audit tool may be configured to collect data and may apply predictive knowledge in analyzing operating trends. The audit tool may be configured to assess the facility operating conditions at intervals for optimization of usage, asset and service performance, etc. Signs of asset degradation may be detected and, if such degradation cannot be corrected remotely, a punch-list of prioritized, corrective actions for execution by the client and/or designated third party may be created.

The customer benefits from this proactive continuous commissioning of a control system, remote system and/or and assets, assuring that these efforts deliver an expanded return on investment as well as providing critical assessments of energy related assets and business performance. This can ensure reliability of business operations and deliver designed energy efficiencies and other reductions in operating costs. Energy related third party performance may be assessed to assure compliance with standards, agreements, and budgeted expenses. An equipment scorecard for tracking performance by a make, model, and configuration of the control system, remote system and/or and assets, and a third party service vendor scorecard for tracking performance by a vendor and by a facility is one of a plurality of measurement and decision analysis tools that may be available from this disclosure.

This disclosure also discusses a plurality of elements associated with performance assurance. More specifically, included in this disclosure are embodiments of Customer-Premises Equipment (CPE) interface, interrogation, optimization, and control. Unlike other processes, the asset optimization solutions disclosed herein with performance assurance can be configured to inter-operate with a plurality of control systems, remote systems and/or Building Automation Systems (BASs) through a comprehensive set of drivers. The performance assurance system, which may include elements of an asset optimization solution suite, may be configured to communicate by utilizing any of a plurality of proprietary protocols, protocol conversion tools, and/or the use of custom designed data acquisition paths. This ability to work with virtually any control system, remote system and/or BAS protocol and select equipment assets may allow clients who have acquired mixed assets and equipment to manage those assets without having to spend large sums of money for a single standard technology.

Unlike some alarms, asset optimization techniques, among others, disclosed herein proactively and continually assess control system, remote system, and/or BAS, perform security and safety tests, and exercises not only the control system, remote system, and/or BAS, but also one or more assets associated with the environment. This may include, but is not limited to, heating systems, ventilation systems, Heating, Ventilation and Air Conditioning (HVAC) systems, lighting systems, security systems, process controllers, refrigerators, and/or other processes.

Unlike some alarms, asset optimization and the performance assurance system may be exercised using proprietary software tools, including commands, protocols, algorithms, data, and/or mathematical models, which far exceed the knowledge possible from any one technician or group of technicians. Asset optimization may be utilized with one or more servers and/or other computing devices and can perform a plurality of virtual audits and/or other tasks and processes in the time that a technician could test only a few systems.

Asset optimization may also include a digital data library, a data store, and/or other components. More specifically, the data store may include current and/or historical data on one or more pieces of customer premises equipment (CPE) for one or more customers. Specifications for optimal operation of such assets may also be provided, as well as lists of specific assets by serial number, type, and performance data for similar assets running in similar environments, etc.

In addition, if available, the data store may include a history of one or more services for one or more assets associated with the environment, as well as provide energy billing data. In some cases the data store may also include site and asset drawings, schematics, specification sheets, as-built drawings, site and asset photographs, and/or other data. Information may be delivered to the user in any of a plurality of ways including, via the Internet, world wide web, email, facsimile, cell phone, pager, PDA, and/or other device configured to communicate with performance assurance.

Referring now to the drawings, FIG. 1 depicts a nonlimiting example of an environment 102 and a control system 104. As illustrated in the nonlimiting example of FIG. 1, the environment 102 is coupled to the control system 104. The environment 102 may include one or more assets, such as an air-conditioning unit, a heater unit, security system, components to a fire alarm system, components to an electrical system, and/or other assets, as nonlimiting examples. The control system 104 may be configured to communicate data to and/or from one or more of the assets associated with environment 102. As discussed above, utilization of the control system 104 with the environment 102 may allow more efficient utilization of assets within the environment 102 by controlling usage based on user preferences.

Figure 2:
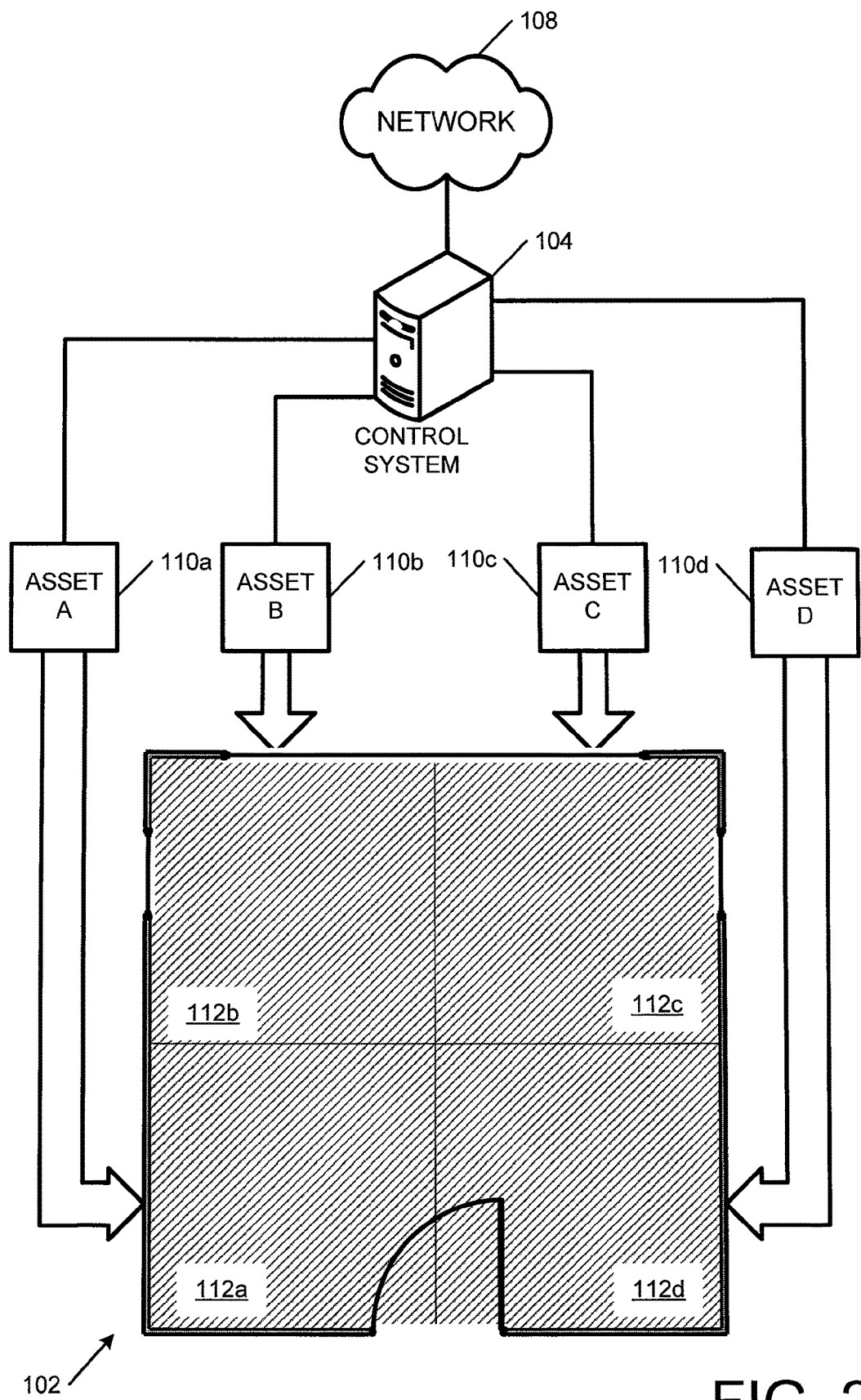
FIG. 2 depicts an exemplary control system with a plurality of assets, similar to the diagram from FIG. 1.

FIG. 2 depicts an exemplary control system with a plurality of assets, similar to the diagram from FIG. 1. As illustrated in the nonlimiting example of FIG. 2, the environment 102 can include a plurality of areas 112a, 112b, 112c, and 112d, each of which may be associated with one or more assets 110a, 110b, 110c, and 110d. More specifically, as illustrated in FIG. 2, asset A 110a is associated with area 112a. Asset A 110a may be an HVAC unit configured to heat and cool area 112a. Asset B 110b may be an HVAC system configured to heat and/or cool area 112b. Similarly, asset C 110c and asset D 110d may be configured to heat and/or cool areas 112c and 112d, respectively. The control system 104 may be configured to receive data from one or more of the assets 110 and/or send data to one or more of the assets 110. As a nonlimiting example, the control system 104 may be configured to control the operation of one or more of the assets 110 on a system level, such that the overall environment 102 may be heated and/or cooled efficiently. Additionally, the control system 104 may be coupled to network 108, which may include the Internet, a public switched telephone network (PSTN), an integrated services digital network (ISDN), cellular mobile network, and/or other communications networks such that data from the environment 102 may be communicated to other parties.

Figure 3:
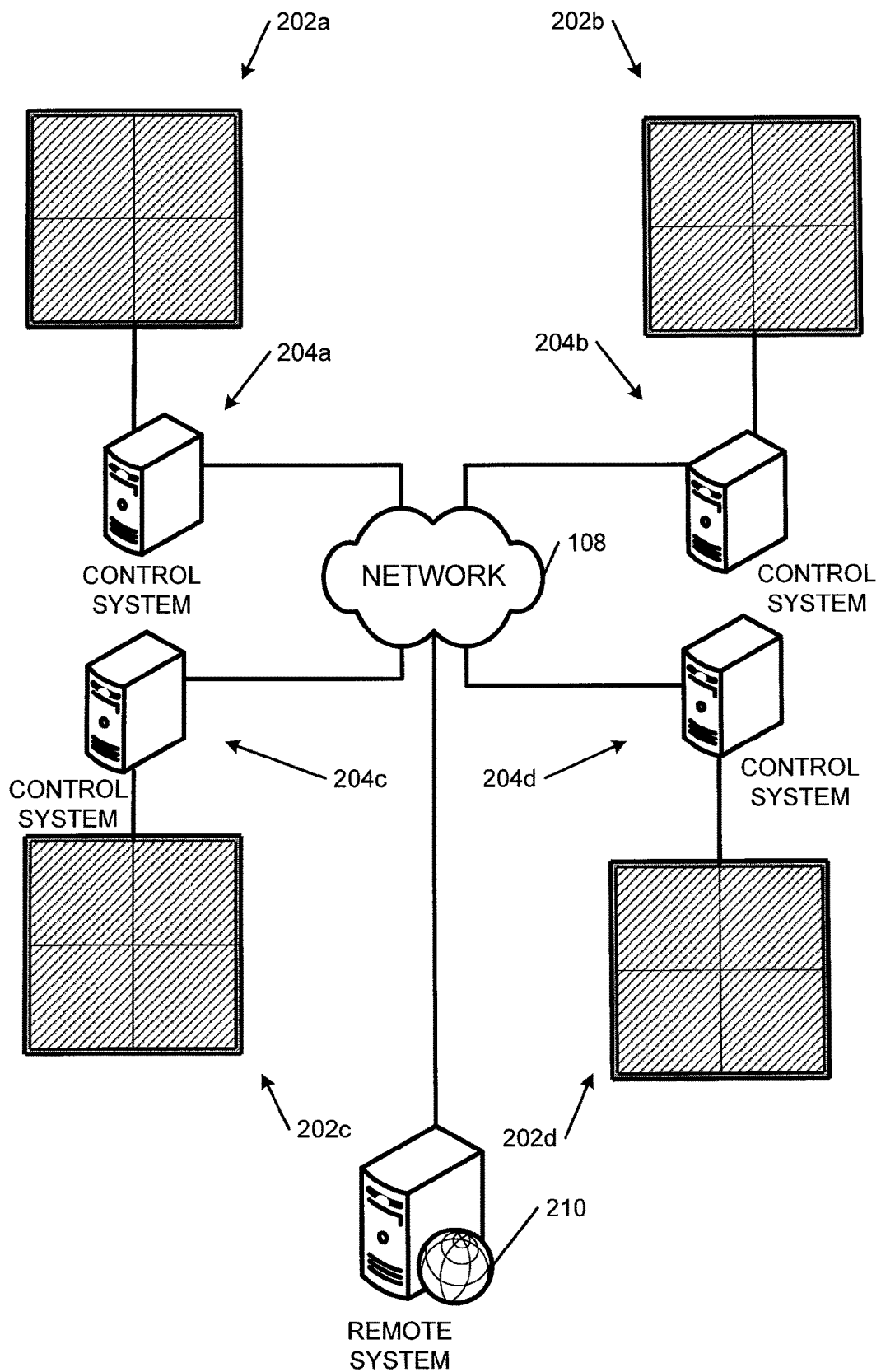
FIG. 3 depicts a plurality of exemplary control systems with a remote system, similar to the diagram from FIG. 2.

FIG. 3 depicts a plurality of exemplary control systems with a remote system, similar to the diagram from FIG. 2. As illustrated in the nonlimiting example of FIG. 3, remote system 210 may be configured to receive communications from and/or send communications to one or more assets associated with environments 202a, 202b, 202c, and 202d via network 108 (and/or communicate with control system 204). More specifically, in at least one embodiment, control systems 204a, 204b, 204c, and 204d may be configured to control assets associated with environments 202a, 202b, 202c and 202d, respectively. Similarly, in some embodiments, assets associated with environments 202 can send data related to operations of the assets, as well as data related to the environment.

As a nonlimiting example, referring again to FIG. 2, asset A 110a, asset B 110b, asset C 110c, and asset D 110d may take the form of HVAC units (this is not a requirement). One or more of the HVAC units 110 may be configured to maintain the temperature of a predetermined area of environment 102. Additionally, (referring to FIG. 3), assets 110 can be configured to collect and send data to remote system 210. The data sent to remote system 210 can include operation data of the HVAC units, such as efficiency, energy consumption, temperature of exiting air, etc.

Similarly, the data sent to remote system 210 can include results data, such as ambient temperature, incoming air temperature, etc. One should note that while some configurations may include one-way communication (e.g., assets 110 (FIG. 2) send data to remote system 210) other configurations may include two-way communications (e.g., remote system 210 sends data to one or more of the assets 110 (FIG. 2) and receives data from one or more of the assets).

After receiving data from assets 110, remote system 210 can make one or more calculations to determine a performance factor related to the operation of one or more of the assets 110 (and/or the system as a whole). From the calculations and/or performance factor, the remote system 210 can adjust one or more settings on the assets 110 and/or schedule the asset for service by a technician. Additionally, remote system 210 may also store at least a portion of the received and/or calculated data for subsequent use.

As another nonlimiting example, in operation, the control system 204a may be configured to manage the assets 110 in the environment 202a. If the assets 110 are HVAC and/or other indoor environment control assets, the control system 204a may be configured to control the assets 110 to provide the desired temperature, humidity and/or other requirements based on one or more customer defined factors. More specifically, the customer may determine factors such as business parameters (e.g., desired monthly energy costs, annual energy costs, etc.), temperature parameters (e.g., desired temperatures based on time of day, time of year, etc.), and/or other parameters for the environment 202a (or plurality of environments 202b, 202c, 202d) as a whole. Accordingly, the control system 204a may be configured to calculate output parameters for each of the assets 110 to provide the desired output.

Similarly, the remote system 210 may be configured as a failover device to the control systems 204; however this is not a requirement. Additionally, in at least one exemplary embodiment, the remote system 210 may be configured to determine output for each environment 202a, 202b, 202c, 202d, and/or for each asset associated with these environments 202a, 202b, 202c, 202d based on the previously discussed customer defined factors. Additionally, the remote system 210 may be configured to determine whether an asset 110 and/or control system 204 is operating properly by sending a "heartbeat" signal at one or more predetermined times.

Additionally, at least one exemplary embodiment may be configured to dynamically accept the addition and/or removal of assets from one or more of the environments 202. Similarly, depending on the particular configuration, the control system 204 and/or remote system 210 may configured with a watchdog routine for facilitating servicing of the assets 101, the control system 204, and/or the remote system 210. As a nonlimiting example, a technician may be servicing one or more of these pieces of equipment and may lower the control system 204 temperature setting to facilitate this service. If the technician forgets to return the system back to normal operating settings, the control system 204 and/or remote system 210 may determine that the technician no longer needs the lower temperature setting and will automatically return to normal operating settings. This determination may be made via a timeout; however this is not a requirement.

Similarly, some embodiments may be configured to catalog environmental standards. More specifically, at least one nonlimiting example the control system 204 and/or remote system 210 may be configured to determine a customer defined desired condition for the environment 202 (e.g., a desired temperature, humidity, etc.). Additionally, cataloging environmental standards may include determining a desired customer defined desired condition based on seasonality standards. Further, the control system 204 and/or remote system 210 may be configured to provide an outside air reset. More specifically, as a nonlimiting example, the control system 204 and/or remote system 210 may be configured to determine an outside air temperature threshold. When the outside air temperature reaches the threshold, the control system 204 and/or remote system 210 may be configured to change the assets' setting from heat to cool (or vice versa, depending on whether the temperature is increasing or decreasing).

One should note that while the embodiments discussed above include air conditioning units, these are nonlimiting examples. More specifically assets 110 (FIG. 2) can include any of a plurality of different devices including, but not limited to, HVAC units, security system components, fire alarm system components, appliances, electronic components, electrical system components, computing logic, etc. Additionally, as different assets may be configured for different functionality, data sent between asset 110a (FIG. 2) and remote system 210 may differ from data sent between asset 110b (FIG. 2) and remote system 210, depending on the particular configuration.

Additionally, while the embodiments described above include a single system (e.g., an HVAC system) associated with an environment, this is also a nonlimiting example. More specifically, depending on the particular configuration, an environment can include any number of different systems, each system with one or more assets that may be communicatively coupled to remote system 210.

Further, in at least one embodiment, the customers may have access to one or more user interfaces for viewing and/or adjusting at least one setting for the environment 202. More specifically, at least one embodiment of a user interface may be configured to provide a way for the customer to change one or more settings. As a nonlimiting example, the user interface may include an option for "low," "medium," and "high" to determine the temperature of the environment 202. Similarly, some embodiments may be actual temperatures, seasons (e.g., spring, summer, autumn, and winter), and/or other settings. This interface may be provided by a dedicated device in the environment, via a personal computer or other computing device located at the environment. Similarly, some embodiments may be configured such that a customer may access the user interface from a remote location via, such as, the Internet.

Figure 4:
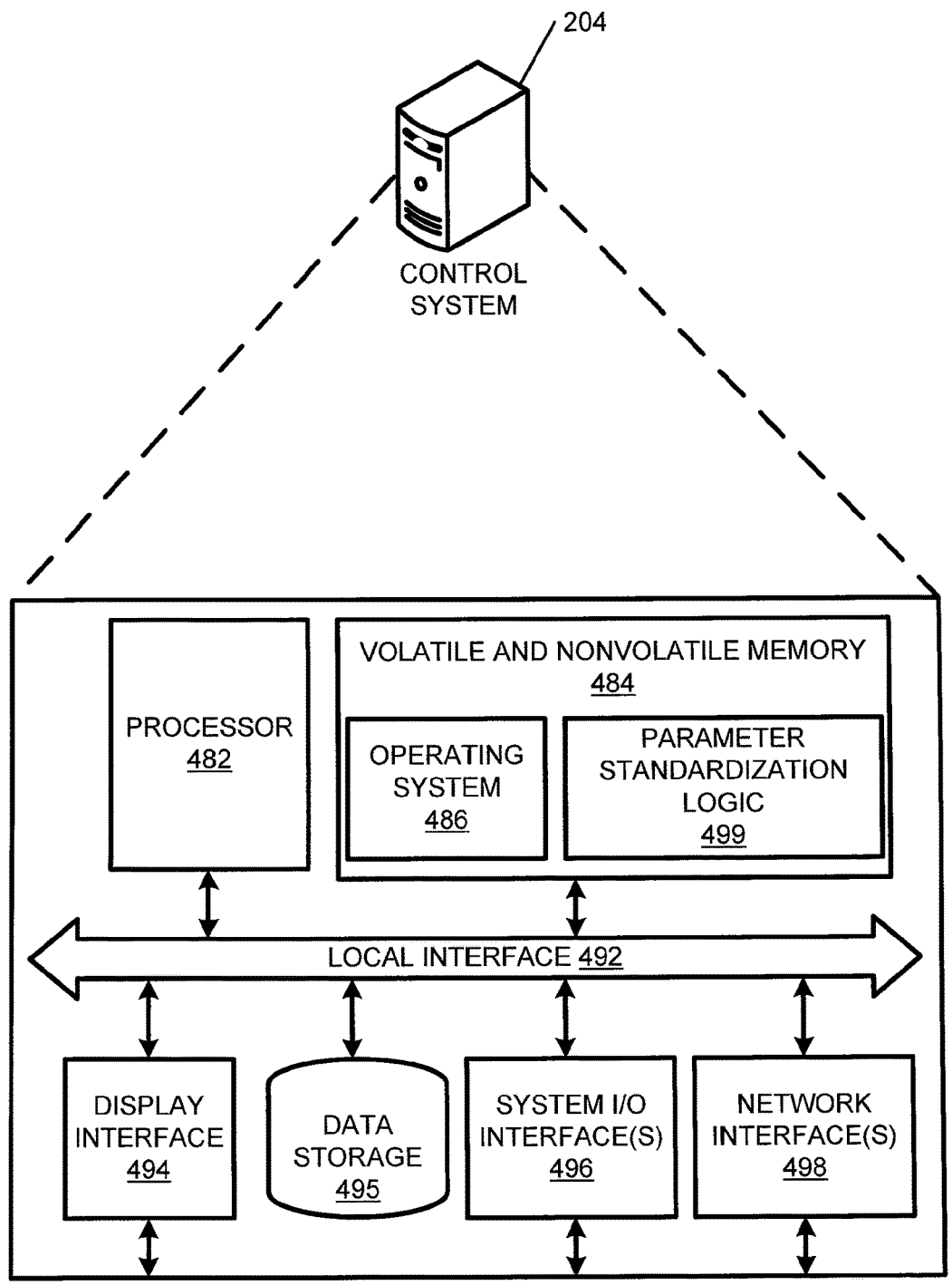
FIG. 4 depicts exemplary components of a control system, such as the control system from FIG. 1.

FIG. 4 depicts exemplary components of a control system, such as the control system from FIG. 1. Although a wire-line client device is illustrated, this discussion can be applied to wireless devices, as well. Generally, in terms of hardware architecture, as shown in FIG. 4, the remote system 210 includes a processor 482, memory component 484, a display interface 494, data storage 495, one or more input and/or output (I/O) device interface(s) 496, and/or one or more network interface 498 that are communicatively coupled via a local interface 492. The local interface 492 can include, for example but not limited to, one or more buses or other wired or wireless connections. The local interface 492 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 482 may be a device for executing software, particularly software stored in memory component 484.

The processor 482 can be any custom made or commercially available processor, a central processing unit (CPU), an auxiliary processor among several processors associated with the client device 106, a semiconductor based microprocessor (in the form of a microchip or chip set), a macroprocessor, or generally any device for executing software instructions.

The memory component 484 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory 484 may incorporate electronic, magnetic, optical, and/or other types of storage media. One should note that the memory component 484 can have a distributed architecture (where various components are situated remote from one another), but can be accessed by the processor 482. Additionally memory component 484 can include asset parameter standardization logic 499 and an operating system 486.

As a nonlimiting example, the parameter standardization logic 499 may be configured to perform the operations discussed herein with regard to the control system 204. The operating system 486 may be configured to control the execution of other computer programs and provides scheduling, input-output control, file and data management, memory management, and communication control and related services.

A system component and/or module embodied as software may also be construed as a source program, executable program (object code), script, or any other entity comprising a set of instructions to be performed. When constructed as a source program, the program is translated via a compiler, assembler, interpreter, or the like, which may or may not be included within the memory component 484, so as to operate properly in connection with the operating system 486.

The Input/Output devices that may be coupled to system I/O Interface(s) 496 may include input devices, for example but not limited to, a keyboard, mouse, scanner, microphone, etc. Further, the Input/Output devices may also include output devices, for example but not limited to, a printer, display, speaker, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

Additionally included are one or more network interfaces 498 for facilitating communication with one or more other devices. More specifically, network interface 498 may include any component configured to facilitate a connection with another device. While in some embodiments, among others, the control system 204 can include a network interface 498 that includes a Personal Computer Memory Card International Association (PCMCIA) card (also abbreviated as "PC card") for receiving a wireless network card, however this is a nonlimiting example. Other configurations can include the communications hardware within the computing device, such that a wireless network card is unnecessary for communicating wirelessly. Similarly, other embodiments include network interfaces 498 for communicating via a wired connection. Such interfaces may be configured with Universal Serial Bus (USB) interfaces, serial ports, and/or other interfaces.

If control system 204 includes a personal computer, workstation, or the like, the software in the memory component 484 may further include a basic input output system (BIOS) (omitted for simplicity). The BIOS is a set of software routines that initialize and test hardware at startup, start the operating system 486, and support the transfer of data among the hardware devices. The BIOS is stored in ROM so that the BIOS can be executed when the client device 106 is activated.

When control system 204 is in operation, the processor 482 may be configured to execute software stored within the memory component 484, to communicate data with the memory component 484, and to generally control operations of the control system 204 pursuant to the software. Software in the memory component 484, in whole or in part, may be read by the processor 482, perhaps buffered within the processor 482, and then executed.

One should note that while the description with respect to FIG. 4 includes the control system 204 as a single component, this is a nonlimiting example. More specifically, in at least one embodiment, control system 204 can include a plurality of servers, personal computers, and/or other devices. Similarly, while parameter standardization logic 499 is illustrated in FIG. 4 as a single software component, this is also a nonlimiting example. In at least one embodiment, parameter standardization logic 499 may include one or more components, embodied in software, hardware, and/or firmware. Additionally, while parameter standardization logic 499 is depicted as residing on a single computing device, as the control system 204 may include one or more devices, parameter standardization logic 499 may include one or more components residing on one or more different devices.

One should also note that the remote system 210 may also include one or more of the components described with regard to the control system 204. To that effect, the remote system 210 may include logic (embodied in software, hardware, and/or firmware), such as the parameter standardization logic 499 (or variation of the parameter standardization logic 499) for performing operations discussed herein.

Figure 5:
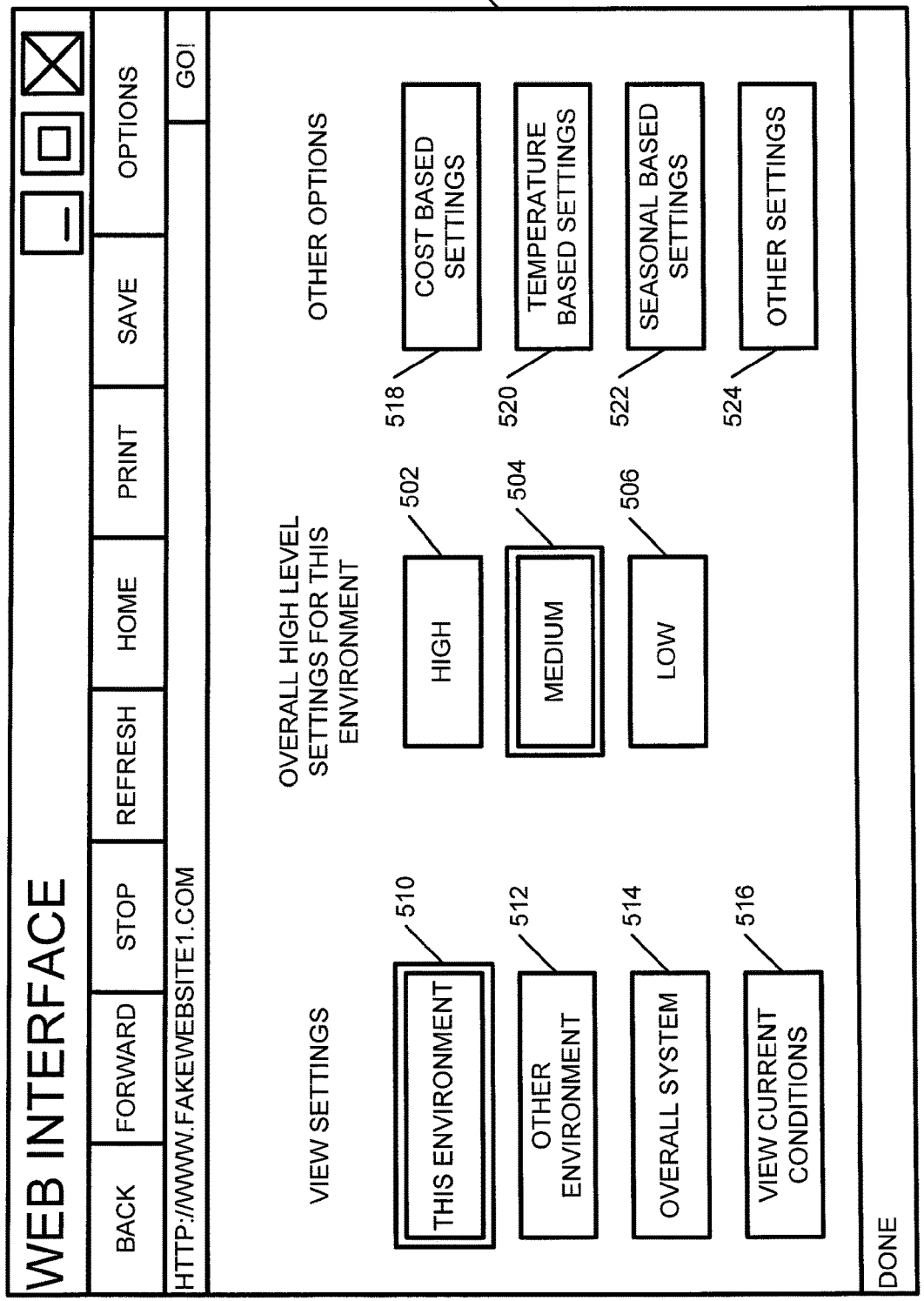
FIG. 5 depicts an exemplary interface that may be provided to a customer for viewing and/or altering at least one setting for an environment, such as an environment from FIG. 3.

FIG. 5 depicts an exemplary interface 500 that may be provided to a customer for viewing and/or altering at least one setting for an environment, such as an environment from FIG. 3. As illustrated in the nonlimiting example of FIG. 5, the interface 500 may be configured for a customer, such as a retail store employee, to select high option 502, medium option 504, and/or low option 506. These options 502-506 may be associated with one or more respective environment conditions (e.g., temperature, humidity, etc.), such that if a customer determines that the temperature is too hot, the customer can select the low option 506. By selecting the low option 506, the control system 204 and/or remote system 210 may determine the desired output for one or more assets 110 that service the environment 202 to provide the desired conditions and additionally provide information related to the asset settings for providing the selected condition.

Also included in the nonlimiting example of FIG. 5 are view settings options. More specifically, the view settings options can provide the user to view and/or alter settings for the current environment via option 510, other environments via option 512, and/or the overall system (e.g., all environments associated with this customer) via option 514. Similarly, the user may be provided with option 516 to view current conditions for one or more of the environments associated with the overall system. The conditions may be an overall temperature of the environment, temperatures at one or more points in the environment, asset utilization data, outside air conditions, and/or other conditions.

Additionally included in the nonlimiting example of FIG. 5 are other options. More specifically, the user may be provided with cost based settings option 518, temperature based settings option 520, seasonal based settings option 522 and other settings option 524. As discussed in more detail below, the cost based settings option 518 may be configured to provide an interface for allowing a user to select environment conditions based on cost and/or other business based criteria. The temperature based settings option 520 may be configured to provide an interface for the customer to select environment conditions based on a desired temperature and/or other environmental conditions. The seasonality based settings option 520 may be configured to provide an interface for the customer to select default settings based on the annual seasons. The other settings option 524 may be configured to provide other options.

Figure 6:
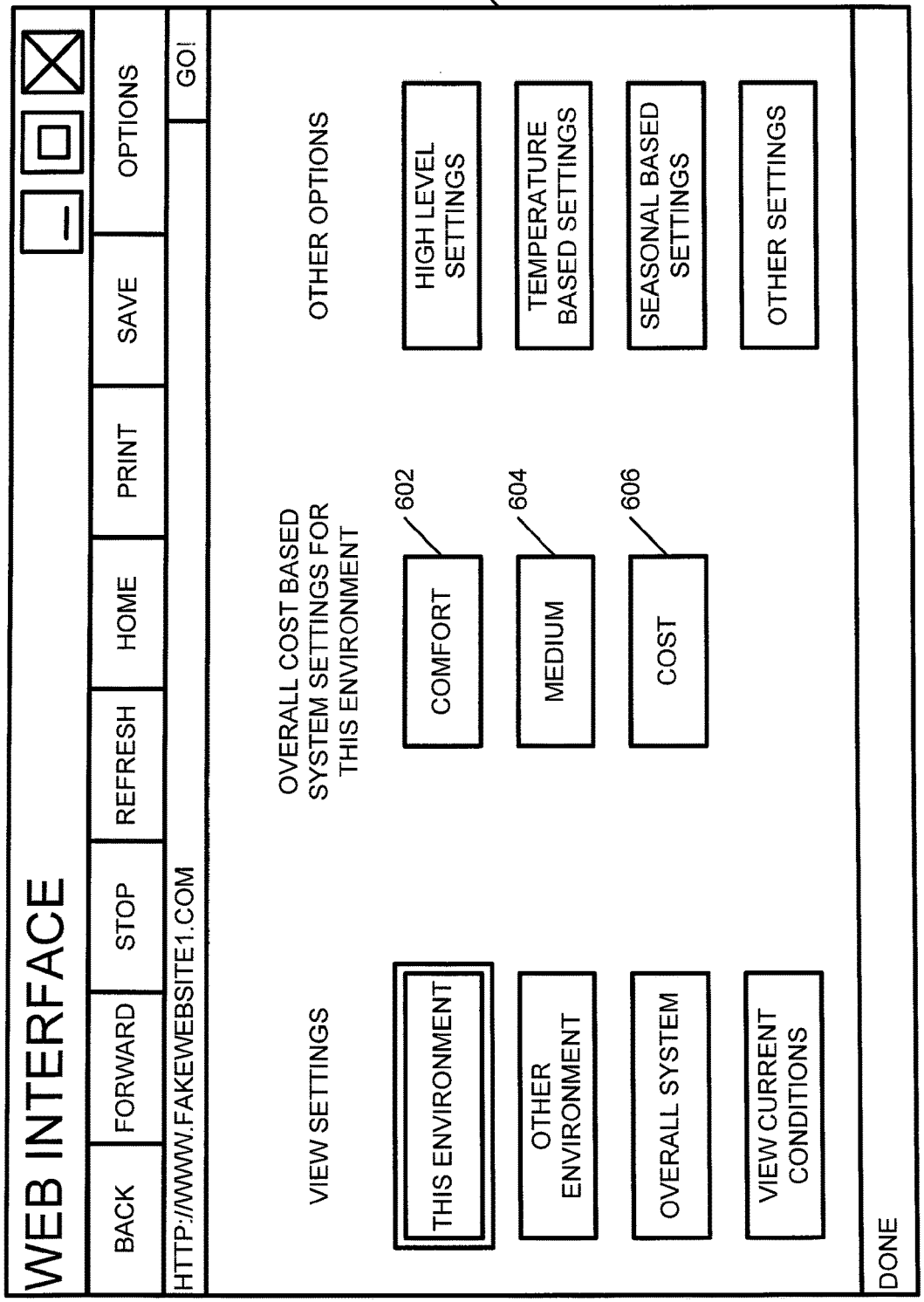
FIG. 6 depicts an exemplary interface that may be provided to a customer for viewing and/or altering at least one cost based setting for an environment, similar to the interface from FIG. 5.

FIG. 6 depicts an exemplary interface 600 that may be provided to a customer for viewing and/or altering at least one cost based setting for an environment, similar to the interface from FIG. 5. As illustrated in the nonlimiting example of FIG. 6, the cost based settings are provided in comfort option 602, medium option 604, and cost option 606. Similar to the options from FIG. 5, by selecting one or more of the options 602-606, the control system 204 and/or remote system 210 may instruct the assets 110 to operate such that the overall environment maintains a predetermined cost level. While the cost option 606 may provide the most cost effective conditions, the comfort option 602 may provide the most comfortable conditions for the environment 202.

Figure 7:
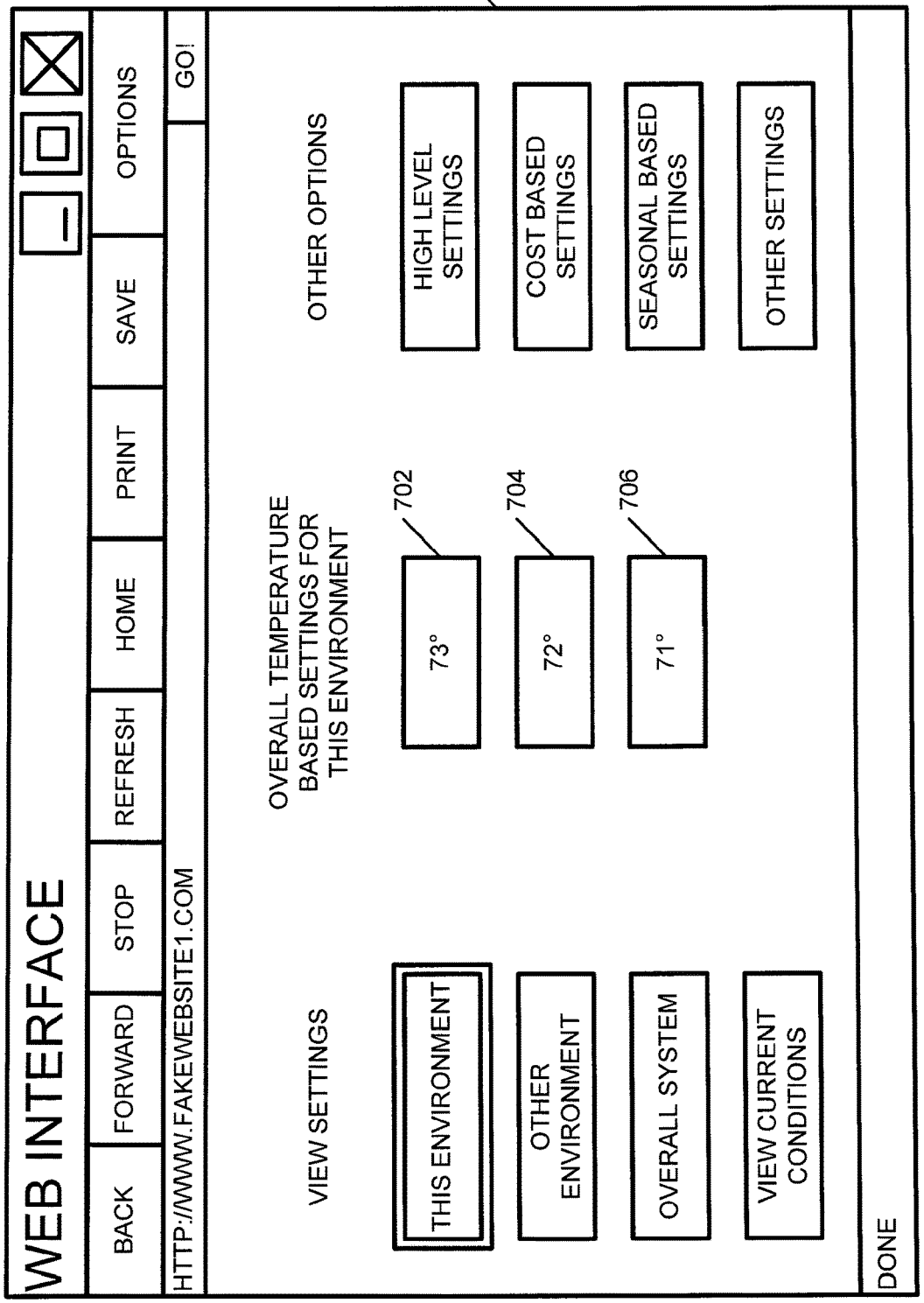
FIG. 7 depicts an exemplary interface that may be provided to a customer for viewing and/or altering at least one temperature based setting for an environment, similar to the interface from FIG. 6.

FIG. 7 depicts an exemplary interface 700 that may be provided to a customer for viewing and/or altering at least one temperature based setting for an environment, similar to the interface from FIG. 6. As illustrated in the nonlimiting example of FIG. 7, overall temperature based settings 702-706 are provided. More specifically, option 702 allows a customer to select a desired environment temperature of 73°. Option 704 allows the customer to select a desired environment temperature of 72°. Similarly, option 706 allows the customer to select a desired environment temperature of 71°.

Figure 8:
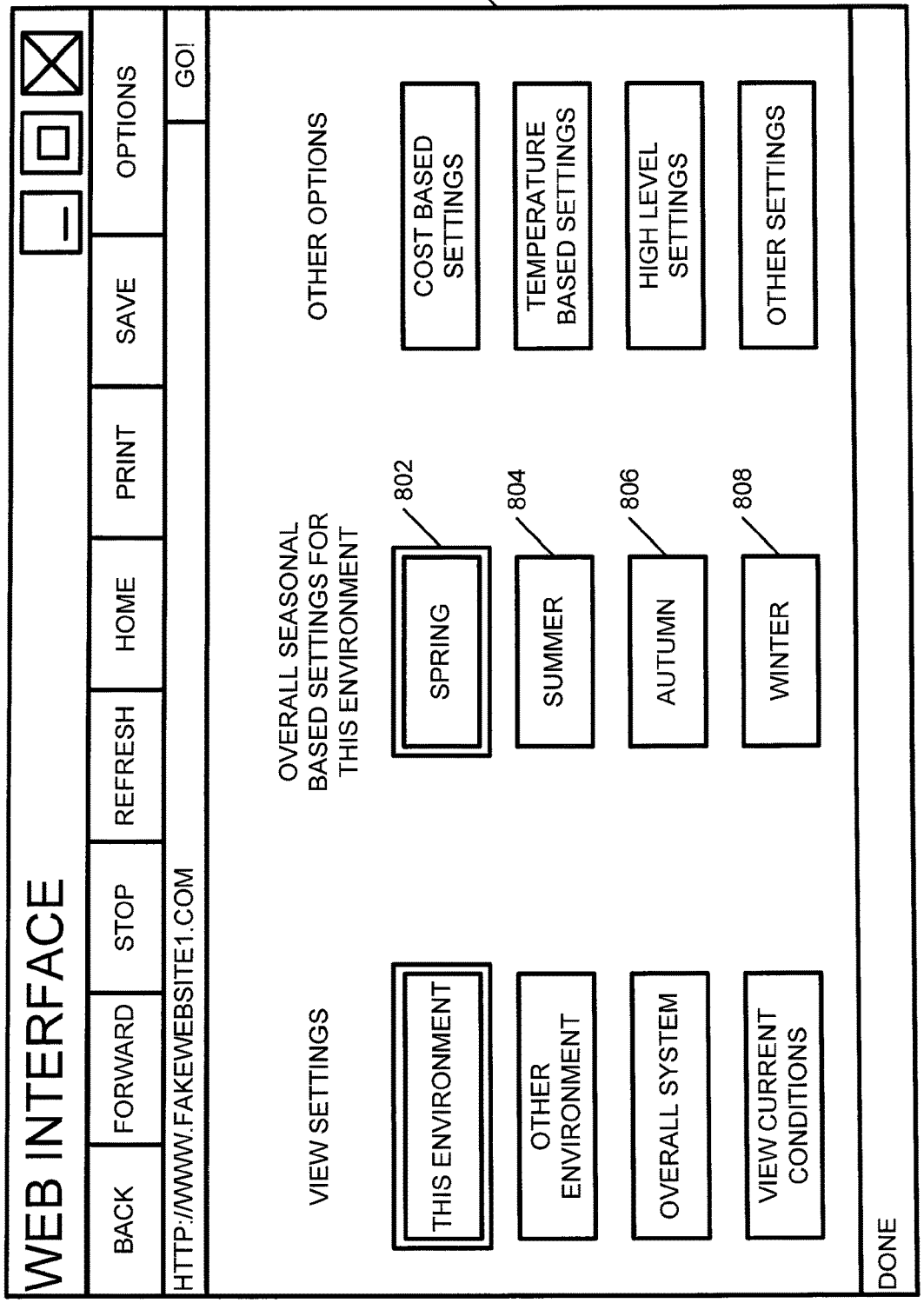
FIG. 8 depicts an exemplary interface that may be provided to a customer for viewing and/or altering at least one seasonal based setting for an environment, similar to the interface from FIG. 7.

FIG. 8 depicts an exemplary interface 800 that may be provided to a customer for viewing and/or altering at least one seasonal based setting for an environment, similar to the interface from FIG. 7. As illustrated in the nonlimiting example of FIG. 8, seasonal options 802, 804, 806, and 808 may be provided for viewing and/or altering seasonal based settings. More specifically, depending on the particular configuration, depending on the particular season, different settings may be desired. As a nonlimiting example, during the Spring, if the outside temperature reaches a predetermined upper temperature threshold (e.g., the temperature is increasing), the control system 204 and/or remote system 210 may be configured to recognize this change, deactivate heating and activate cooling. However, if the same temperature threshold is reached during the Winter, the control system 204 and/or remote system 210 may recognize this as an anomaly and not make such adjustments.

As the control system 204 and/or remote system 210 may be configured to determine the current season, the options 802-808 may be configured to override the determined season, and/or provide customer options to set additional options, such as start dates for a season, end dates for a season, threshold temperatures, and/or other options.

Figure 9:
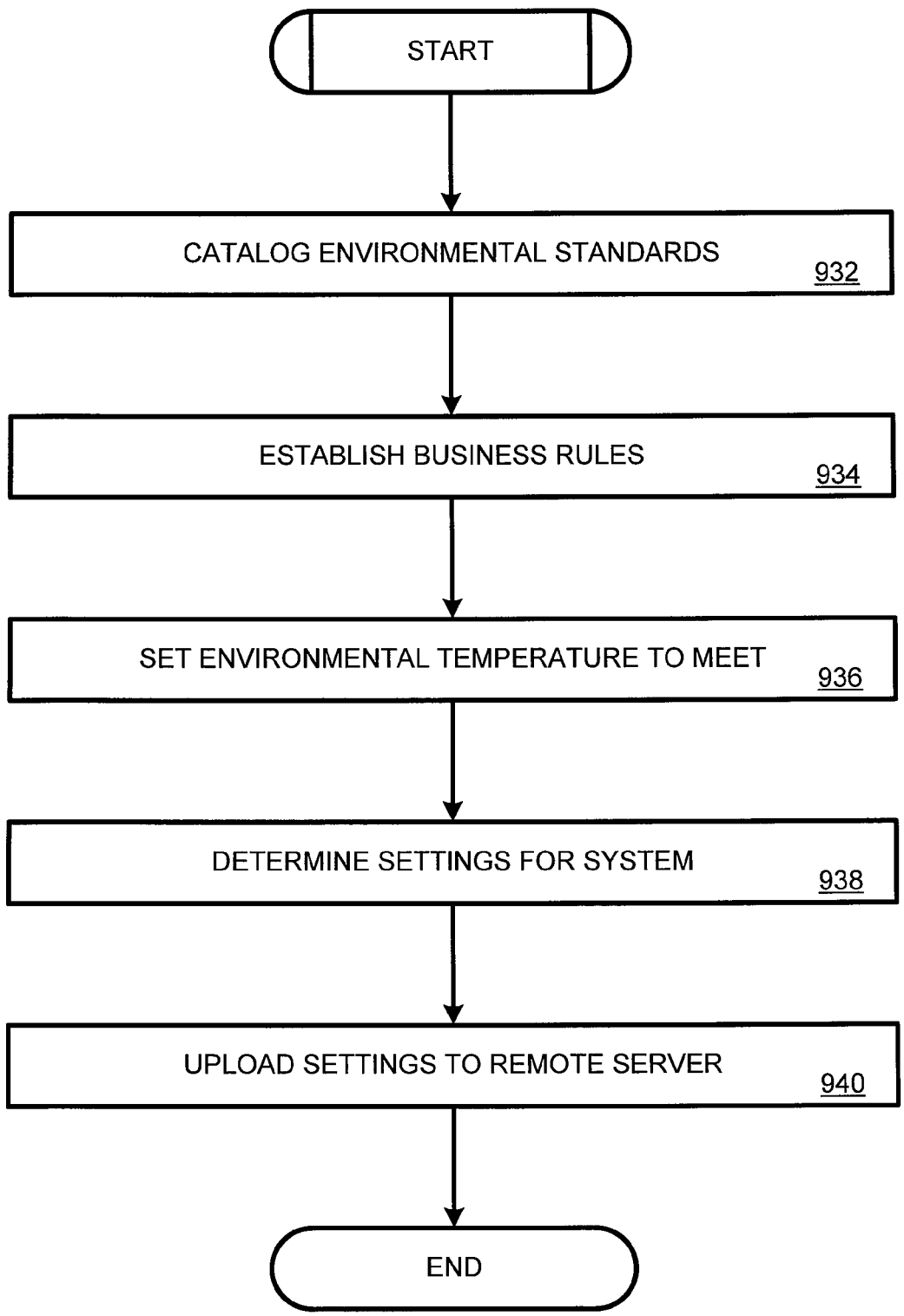
FIG. 9 depicts a flowchart illustrating an exemplary embodiment of a process that may be utilized for uploading settings to a remote server, such as with the environment from FIG. 1.

FIG. 9 depicts a flowchart illustrating an exemplary embodiment of a process that may be utilized for uploading settings to a remote server, such as with the environment from FIG. 3. As illustrated in the nonlimiting example of FIG. 9, the control system 204 and/or remote system 210 may be configured to catalog environmental standards (block 932). As a nonlimiting example, average outside air temperature, average outside humidity, geographical location, and/or other standards may be input by a technician and/or determined by the control system 204 and/or remote system 210. Additionally, the control system 204 and/or remote system 210 may determine business rules (block 934). More specifically, business rules such as desired operating costs, desired longevity of assets, and/or other rules may be determined by a customer and input by a technician into the control system 204 and/or remote system 210. Similarly, the control system 204 and/or remote system 210 may set one or more environmental temperature to meet (block 936). This setting may be entirely dictated by the established business rules, may be partially dictated by the established business rules and/or may be unrelated to the business rules. From the above determined criteria, the control system 204 and/or remote system 210 may determine settings for the system (block 938). More specifically, the control system 204 and/or remote system 210 may determine settings on a per asset basis for an environment and/or for a plurality of environments associated with this customer. Additionally, if the settings are determined at the control system 204, the settings may be uploaded to the remote server 210 (block 940).

Figure 10:
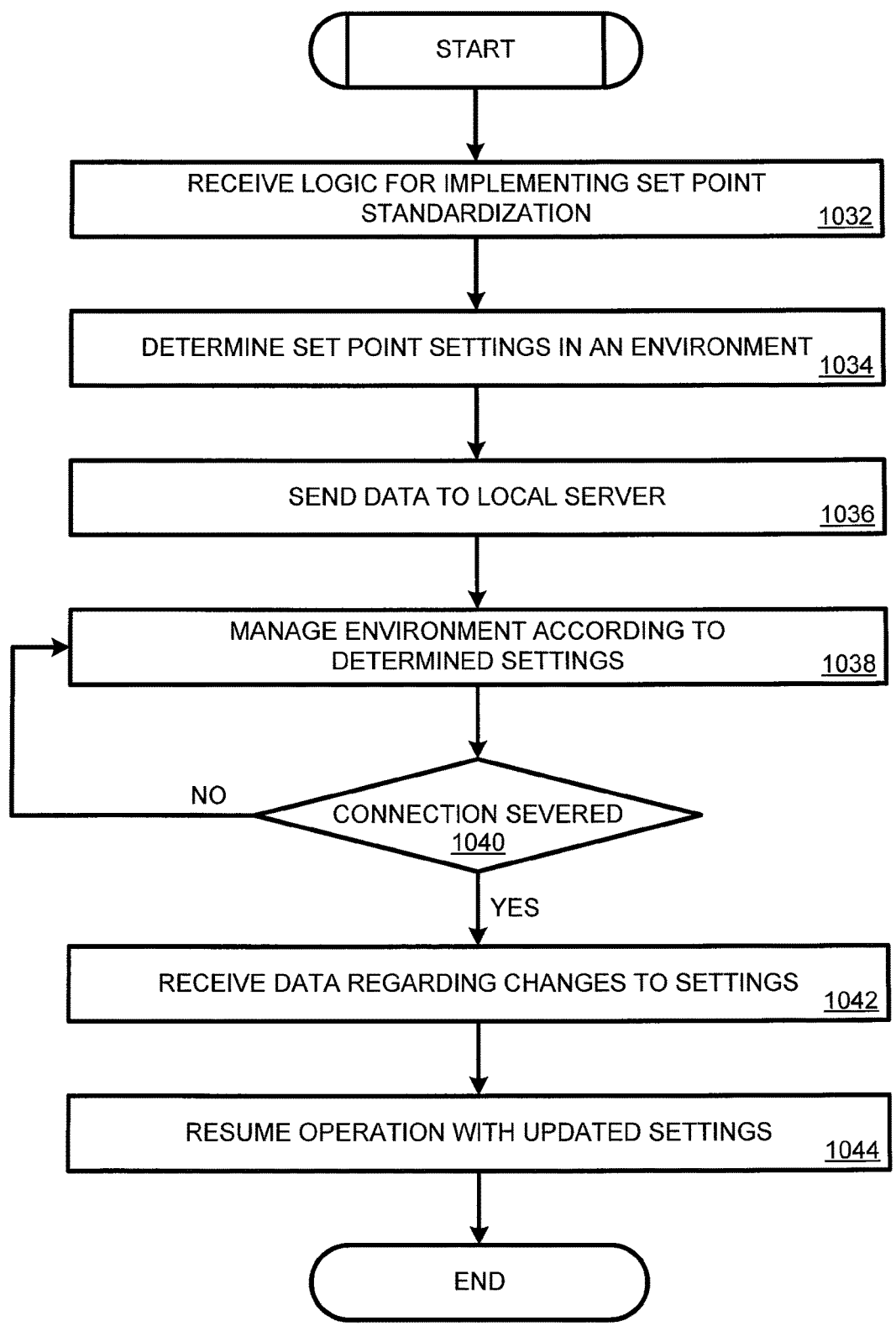
FIG. 10 depicts a flowchart illustrating an exemplary embodiment of a process that may be utilized for managing an environment according to determined settings, similar to the flowchart from FIG. 9.

FIG. 10 depicts a flowchart illustrating an exemplary embodiment of a process that may be utilized for managing an environment according to determined settings, similar to the flowchart from FIG. 9. As illustrated in the nonlimiting example of FIG. 10, the remote system 210 may receive logic for implementing set point standardization (block 1032). As discussed above, the set point standardization logic may include the determined settings from block 938 of FIG. 9. Additionally, the remote system 210 can determine the set point settings for one or more environments (block 1034). The set point settings may include asset specific settings to achieve the desired environmental and/or business conditions. This data can then be sent to the control system 204 (block 1036). The control system 204 can manage the one or more environments according to the determined settings (block 1038). A determination can be made whether the connection between the control system 204 and the environment 202 (block 1040) is severed. If the connection has not been severed, the flowchart returns to block 1038. If, however, the connection has been severed, the remote system 210 can receive data regarding changes to the settings that have occurred since the remote server 210 was last updated (block 1042). Similarly, the remote server 210 can resume operation with the updated settings (block 1044).

Figure 11:
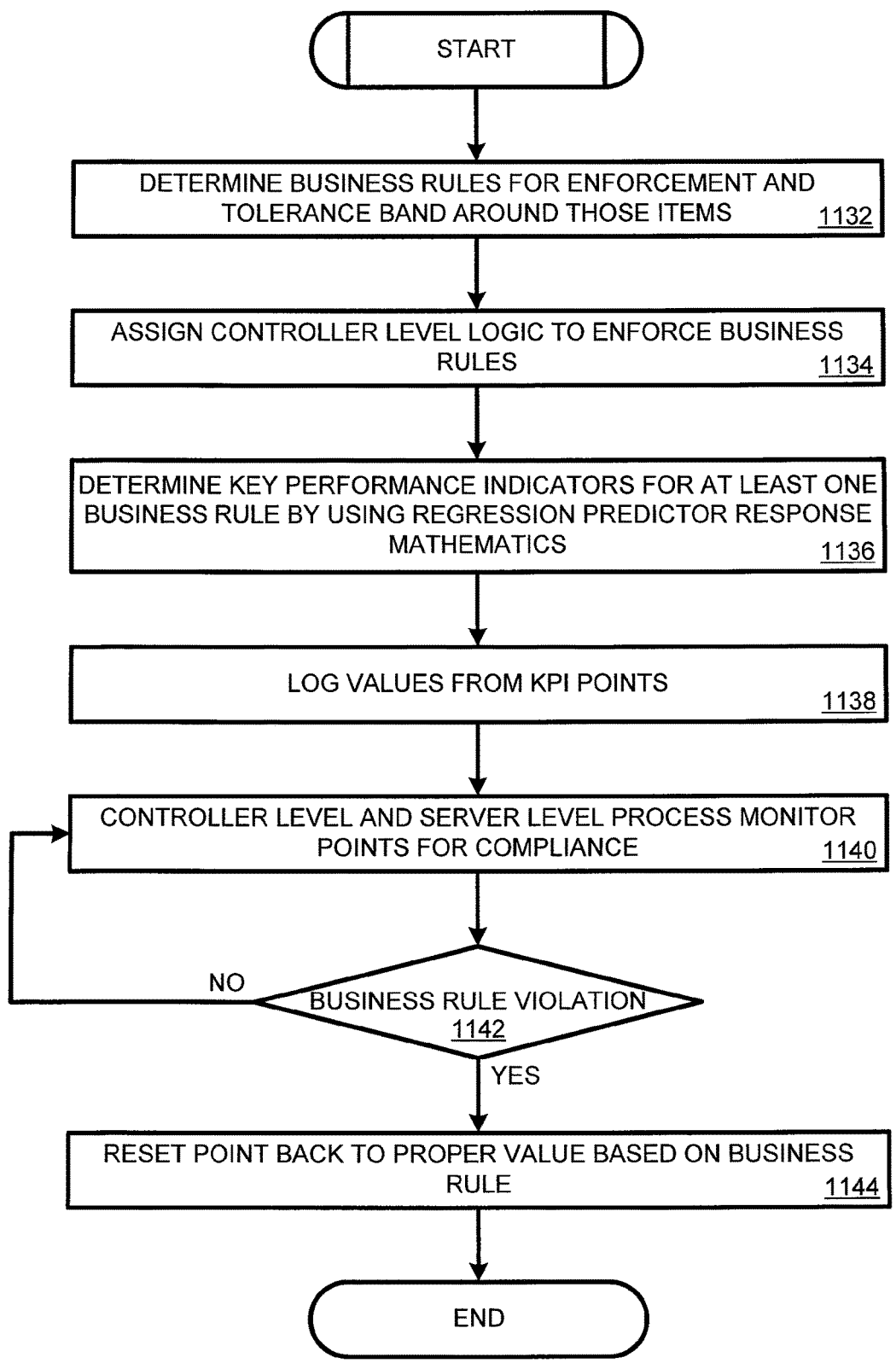
FIG. 11 depicts a flowchart illustrating an exemplary embodiment of a process that may be utilized for implementing at least one business rule, similar to the flowchart from FIG. 10.

FIG. 11 depicts a flowchart illustrating an exemplary embodiment of a process that may be utilized for implementing at least one business rule, similar to the flowchart from FIG. 10. As illustrated in the nonlimiting example of FIG. 11, the control system 204 and/or remote system 210 can determine business rules for enforcement and a tolerance band around the business rules (block 1132). More specifically, the control system 204 and/or remote system 210 may be configured to determine the business rules, as discussed above, as well has criteria for enforcing the business rules and a tolerance band, if the business rules are not fully enforced. Similarly, the control system 204 and/or remote system 210 can assign controller level logic to enforce the business rules (block 1134). More specifically, the controller level logic may reside at the control system 204 and/or at an asset. Additionally, the control system 204 and/or remote system 210 can determine performance indicators for at least one business rule, by utilizing regression predictor response mathematics (block 1136). Additionally, the control system 204 and/or remote system 210 can log values from key performance indicator (KPI) points (block 1138). Similarly, the control system 204 and/or remote system 210 can monitor the assets and environment conditions to determine points of compliance (block 1140). A determination can then be made whether a business rule has been violated (block 1142). If a business rule has not been violated, the flowchart can return to block 1140. If, however, a business rule has been violated the point can be resent back to the proper value based on the business rule (block 1144).

Key performance indicators may be configured to define a set of values used to measure against. These raw sets of values may be sent to systems to summarize information against may be called indicators. Indicators identifiable as possible candidates for KPIs can be summarized into the following sub-categories: quantitative indicators, which can be presented as a number; practical indicators that may interface with existing company processes; directional indicators specifying whether efficiency an organization is improving; actionable indicators may be sufficiently in an organization's control to effect change; key performance indicators in practical terms and strategy development means may be objectives to be targeted that will add the value to the business most (most=key indicators of success).

Figure 12:
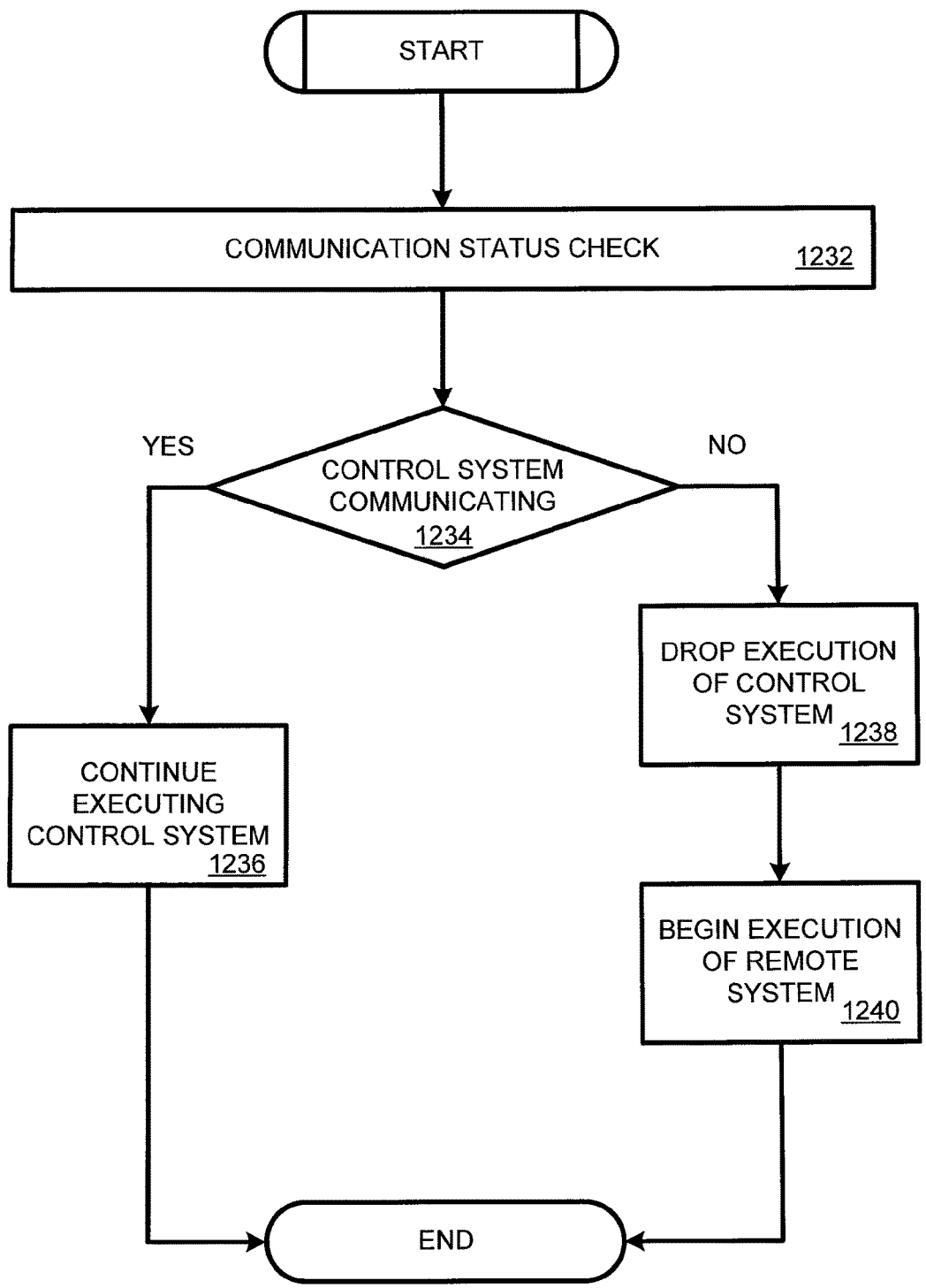
FIG. 12 depicts an exemplary embodiment of a flowchart illustrating failover protection for a control system, such as in the configuration from FIG. 3.

FIG. 12 depicts an exemplary embodiment of a flowchart illustrating failover protection for a control system, such as in the configuration from FIG. 3. As illustrated in the nonlimiting example of FIG. 12, the remote system 210 can perform a communications status check with the control system 204 (block 1232). A determination can be made whether the control system 204 is communicating (block 1234). If so, the control system 204 can continue executing (block 1236). If, however, the control system 204 is not communicating, execution of the control system 204 can be dropped (block 1238) and execution of the remote system 210 can begin (block 1240).

One should note that while the remote system 210 is depicted in FIG. 12 as being utilized as a failover device for the control system 204; this is a nonlimiting example. More specifically, in at least one exemplary embodiment, the control system 204 may be utilized as failover protection for the remote system 210. In such a configuration, similar steps may be taken.

Figure 13:
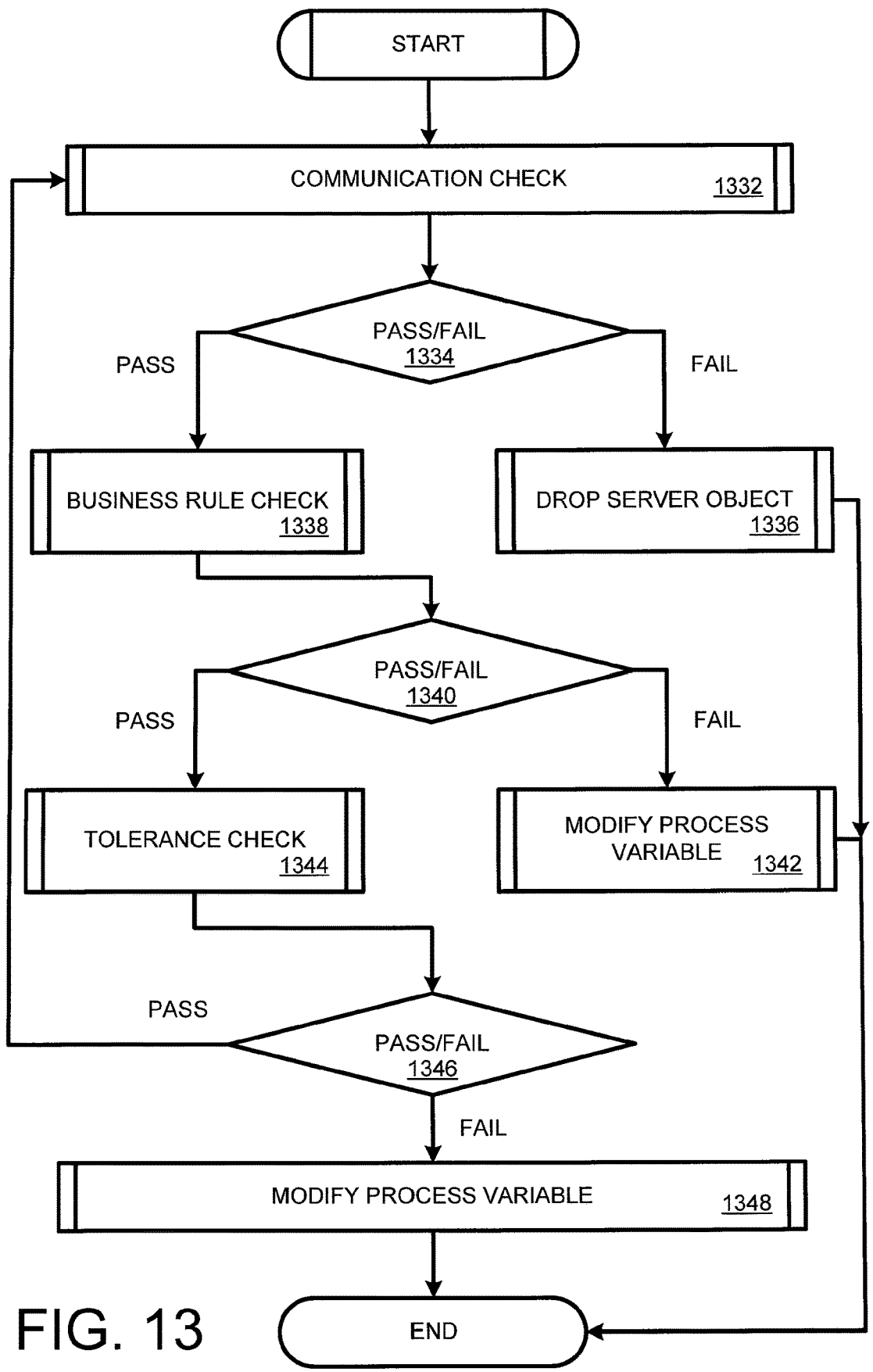
FIG. 13 depicts an exemplary embodiment of a flowchart illustrating a watchdog function, such as in the configuration from FIG. 3.

FIG. 13 depicts an exemplary embodiment of a flowchart illustrating a watchdog function, such as in the configuration from FIG. 3. As illustrated in the nonlimiting example of FIG. 13, a communications check may be performed (block 1332). The communications check may include a check of the control system 204 and/or the remote system 210. If the control system 204 and/or the remote system 210 fail the communications check, the server object (the control system 204 and/or the remote system 210) that is current being utilized may be dropped (block 1336). In such a scenario, failover protection may be utilized, by beginning execution of a failover device; however this is not a requirement.

If at block 1334, the control system 204 and/or the remote system 210 pass the communication check, an implemented business rule may be checked (block 1338). As discussed above, the business rule may include a desired cost of operation, a desired schedule of operation, and/or other business-related rules. If the control system 204 and/or the remote system 210 fail the business rule check, at block 1340, a process variable may be modified (block 1342) and the process may end. If, on the other hand, the control system 204 and/or the remote system 210 pass the business rule check, a tolerance check may be performed (block 1344). If the control system 204 and/or the remote system 210 pass the tolerance check, the process may end and/or return to block 1332 for a communication check 1332. Similarly, if the tolerance check fails at block 1346, the process variable may be modified (block 1348) and the process may end (and/or return to block 1332).

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A computer-implemented method, comprising:
   providing a graphical user interface via a display device, the graphical user interface being operative to display a plurality of selections, a first of the selections being associated with a first business rule, a second of the selections being associated with a second business rule;
   automatically monitoring:
      an environmental parameter of a first environment; and
      at least one operational parameter of equipment associated with the first environment, the operational parameter being based at least in part on energy consumption of the equipment;
   receiving, via a communication network, information corresponding to a user selection at the user interface, the user selection corresponding to the first business rule;
   automatically determining operating settings for the equipment, via computer processor-executed instructions, based at least in part on, the information received and the at least one operational parameter, the equipment being operative to alter the environmental parameter; and
   automatically instructing, via the communication network, the equipment to implement the first business rule by operating at the settings being determined;
   wherein, responsive to receiving the information corresponding to a user selection corresponding to the second business rule, the equipment is automatically instructed, via the communication network, to alter the operating settings to implement the second business rule.

2. The method of claim 1, further comprising logging, in a non-transitory computer readable medium, at least one value associated with the operating settings.

3. The method of claim 1, wherein the equipment includes at least one heating ventilation air conditioning (HVAC) unit.

4. The method of claim 3, wherein the operating settings include at least one of the following: temperature settings and humidity settings.

5. The method of claim 1, wherein automatically determining operating settings includes utilizing regression predictor response mathematics.

6. The method of claim 1, wherein the first business rule corresponds to cost based operating settings and the second business rule corresponds to temperature based operating settings.

7. The method of claim 1, wherein the automatically monitoring, the receiving, the automatically determining, and the automatically instructing steps are performed remote from the first environment.

8. The method of claim 1, further comprising:
   automatically monitoring environmental parameters corresponding to multiple environments and operational parameters of equipment associated with the multiple environments;
   automatically determining operating settings for the equipment associated with the multiple environments, via computer processor-executed instructions; and
   automatically instructing, via the communication network, the equipment to implement the first business rule by operating at the settings determined at the multiple environments.

9. The method of claim 1, wherein the first business rule corresponds to a user selected strategy for operating the equipment.

10. The computer-implemented method of claim 1, further comprising:
    automatically tracking performance of the equipment; and
    preparing a scorecard describing, at least in part, the equipment performance.

11. The computer-implemented method of claim 1, further comprising automatically executing a watchdog routine, wherein the watchdog routine alters, without regard to the user selection at the user interface, the operating settings of the equipment from service settings to normal operating settings.

12. A control system, comprising:
    a user interface configured to receive a user input representing selection of a business rule as a selected business rule from a plurality of business rules represented by the user interface, the plurality of business rules including at least a first business rule and a second business rule;
    a determining component configured to determine settings for a first asset of a first environment communicating according to a first protocol and settings for a second asset of a second environment communicating according to a second protocol, the settings being based at least in part on a plurality of monitored parameters of the first environment and the second environment relating to environmental conditions such that the settings enforce the selected business rule from among the plurality of business rules; and a sending component configured to send a signal to the first asset and the second asset to implement the selected business rule;

wherein, responsive to the user input representing the selection of the first business rule as the selected business rule, the determining component determines settings for the first asset and the second asset to enforce the first business rule and, responsive to the user input corresponding to the second business rule as the selected business rule, the determining component determines settings for the first asset and the second asset to enforce the second business rule.

13. The control system of claim 12, further comprising a communicating component configured to communicate with a remote system, the remote system being operative to determine the settings of the first asset and the second asset, based at least in part on whether the control system is operating properly.

14. The control system of claim 13, wherein the remote system is operative to provide failover protection for the control system.

15. The control system of claim 12, further comprising a logging component configured to log at least one value associated with the determined settings.

16. The control system of claim 12, further comprising a monitoring component configured to monitor the first asset and the second asset for compliance with the business rule selected at the user interface.

17. The control system of claim 12, wherein the control system is implemented as a non-transitory computer readable medium comprising the determining component.

18. The control system of claim 12, wherein the first business rule corresponds to cost based settings and the second business rule corresponds to temperature based settings.

19. The control system of claim 12, wherein:
the determining component is configured to determine settings for each of a plurality of assets including the first asset and the second asset, the respective settings being based at least in part on a corresponding monitored parameter of an environment associated with each of the assets such that the settings enforce the business rule selected from among the plurality of business rules; and
the sending component is configured to send a corresponding signal to each of the assets to implement the business rule.

20. The control system of claim 12, further comprising a communication component configured to communicate with a remote system, the remote system being operative to:
receive data from the assets, the data relating to the monitored parameters and the settings; and
schedule a technician visit based at least in part on the data being received.

21. A control system, comprising:
means for providing a user interface configured to receive a user input indicating selection of a business rule as a selected business rule from a plurality of business rules represented by the user interface, the plurality of business rules including at least a first business rule and a second business rule;
means for determining settings for a first asset and a second asset, the settings being based at least in part on a plurality of monitored parameters of a first environment and a second environment respectively associated with the first asset and the second asset such that the settings enforce the selected business rule from among the plurality of business rules;
in the event the first environment and the second environment are located within a building, means for sending a signal to the plurality of assets to implement the selected business rule such that the first asset and the second asset operate to implement the selected business rule within the building; and
in the event the first environment is located within a building and the second environment is located other than within the building, means for sending a signal to the plurality of assets to implement the selected business rule such that the first asset and the second asset operate to implement the selected business rule within the building and the other than within the building, respectively.

22. The control system of claim 21, further comprising means for communicating with a remote system, wherein the remote system is operative to provide failover protection for the control system.

23. The control system of claim 21, further comprising means for monitoring the first asset and the second asset for compliance with the business rule selected at the user interface.

24. The control system of claim 12, further comprising means for communicating with a remote system, the remote system comprising:
means for monitoring a plurality of parameters of the first environment and the second environment;
means for determining the settings for the first asset and the second asset; and
means for sending a signal to the first asset and the second asset to implement the selected business rule.

* * * * *